M. P. COONS.
Car Brake.
No. 11,517.
2 Sheets—Sheet 1.
Patented Aug. 15, 1854.
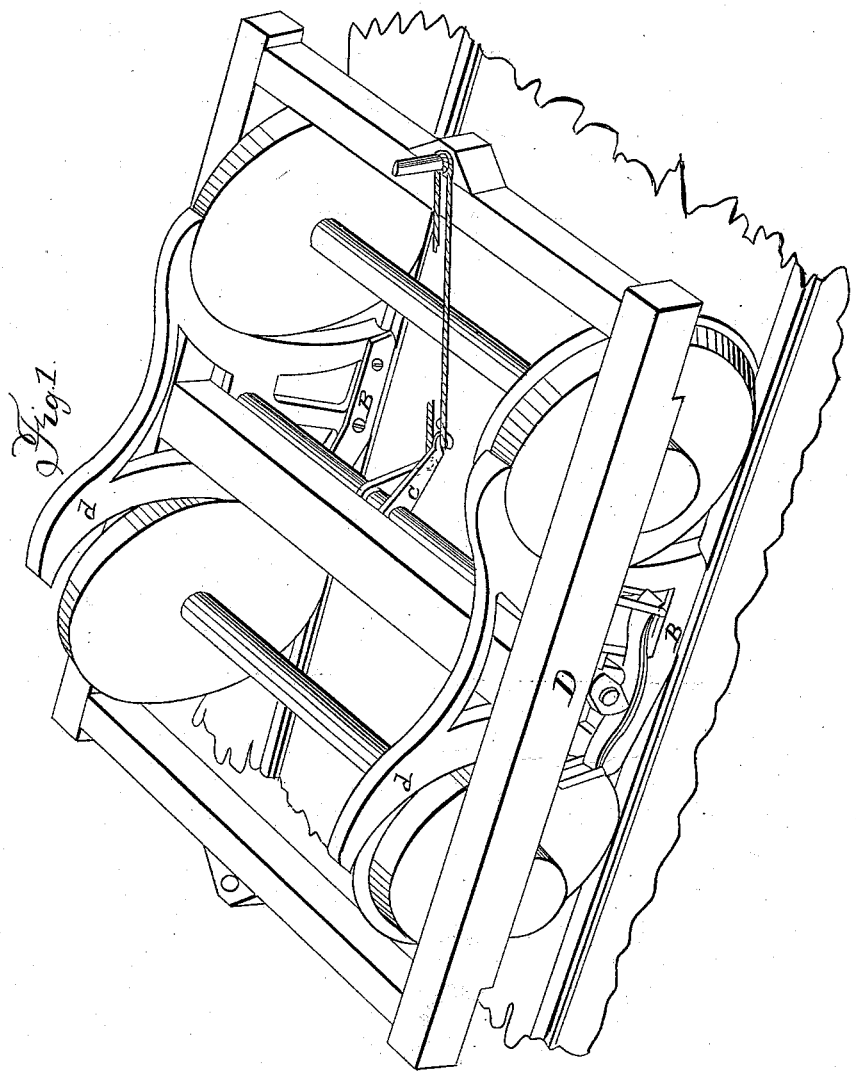

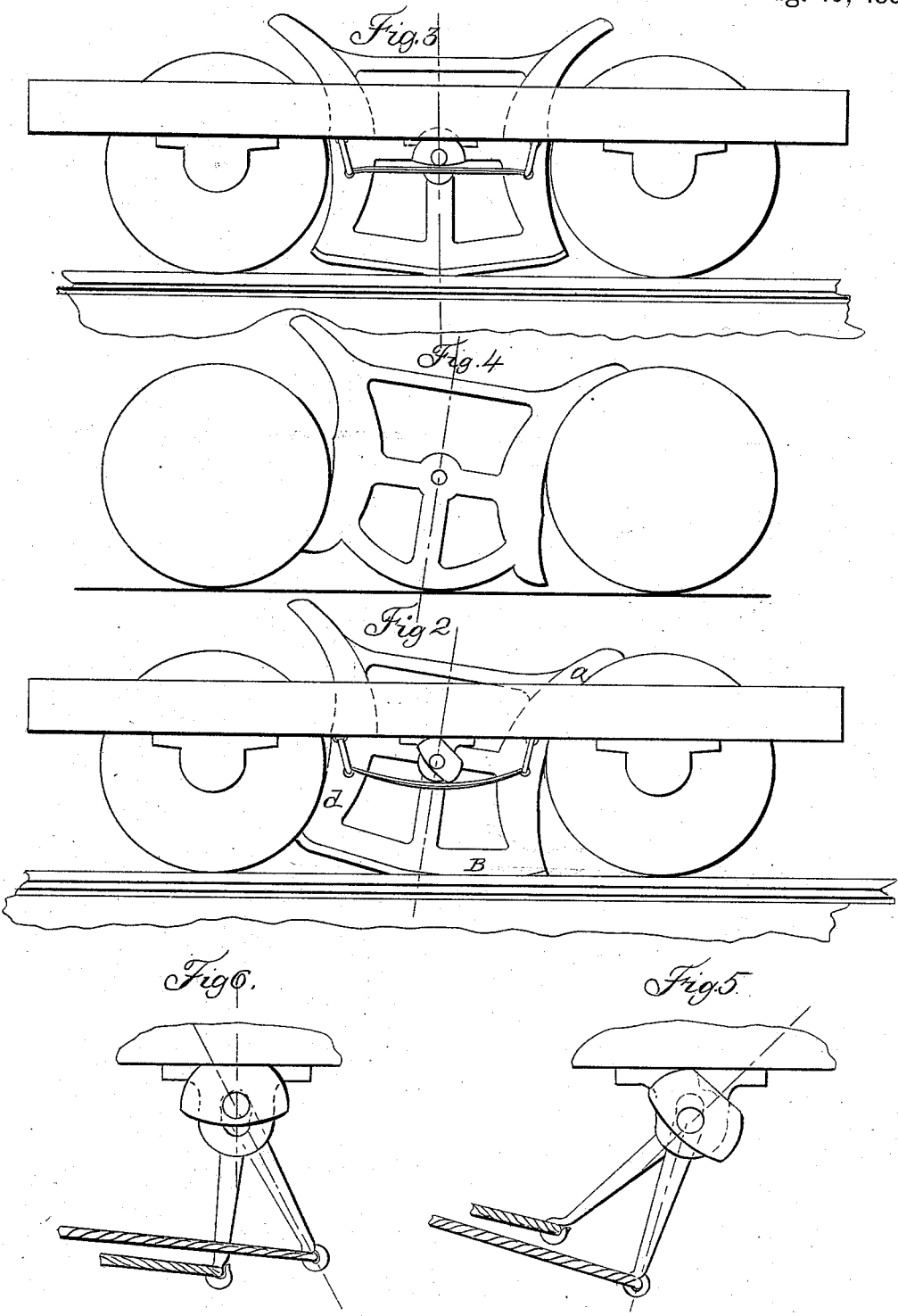

UNITED STATES PATENT OFFICE.

MATTHIAS P. COONS, OF BROOKLYN, NEW YORK.

RAILROAD-CAR BRAKE.

Specification of Letters Patent No. 11,517, dated August 15, 1854.

*To all whom it may concern:*

Be it known that I, MATTHIAS P. COONS, of the city of Brooklyn, county of Kings, and State of New York, have invented a new and useful Device or Apparatus for the Purpose of a Railroad-Car Brake; and I do hereby declare that the following is a full, clear, and exact description of the construction and operation of the same, reference being had to the annexed drawings, forming a part of this specification.

The nature of my invention consists in the peculiar construction, application and operation of a railroad car brake, which when applied operates upon the rail and upon each aft and forward wheel of the car truck to which it is attached, so that when in contact with the rail the brake instantly applies itself to and "brakes" upon each wheel in the relative proportion to the friction produced upon the rail; thus it brakes upon the rails and wheels at the same time.

To enable others conversant with the mechanic arts to make and use my invention, I will describe its construction and operation.

The form of the brakes are made to correspond with the space (see profile view) existing between the wheels of a car truck having four wheels. The truck frame may be made of wrought or cast iron or wood, having in the central part on each side a hub or box for the introduction of the journals of an axle or shaft. This axle or shaft is secured midway between the axles of the car wheels and parallel with them by slotted boxes. These slotted boxes are of sufficient length vertically to admit of a perpendicular motion of the axle to the extent required.

For the purpose of convenience I place a set of steel "cradle springs" secured and suspended by "hangers" or stirrups directly under each end, and the brake axle resting thereon, the axle being held in its place by the slotted boxes. The arm attached to the cam or lever shaft having a cord or iron rod attached extending to the brakeman's lever wrench, which by being acted upon causes the cam levers at each end of the lever shaft to press upon the brake axle, and by the springs yielding to the pressure thus produced the upward or downward motion required.

The brakes being attached to the journals of the axle by their central hubs, when inoperative are suspended between the wheels of the truck, and rest on and are supported by the springs, and are also held up against a cross beam or plate, fitted for the purpose of holding them firmly in place. When operated, the cam levers are pressed downward upon the shaft until the shoe at the bottom of the brake comes in contact with the rail, and by the onward motion of the car friction is produced in proportion to the pressure upon the rail which causes the bottom of the shoe of the brake to incline backward until it comes in contact with the lower quarter of the face of the aft wheel, at the same time the upper shoe of the brake adapts itself to the upper quarter of the forward wheel, each part of the brake being properly curved to fit the face of the wheels. Thus, each wheel is embraced and operated upon in proportion to the amount of friction produced upon the rail.

The exact form and dimensions of the brake depend upon the size of the wheels and the space between them, which is more particularly exemplified by the drawings accompanying this specification.

The practical operation of this brake may be considered self acting and self regulating, as in its application it can only bear upon the parts intended in exact proportion, and consequently cannot wring or twist the wheel axles by holding one wheel (on the same axle) more than the other.

The bearings or shoes are six in number, and three are applied at the same time, two of which are applied to the wheels and one to the rail; the friction produced by the latter thus becomes the fulcrum and the central point of leverage, from which emanates the power of compression upon the wheels and consequently each point of friction must regulate itself each to the other, and hence all the shoes must be equally worn.

The shoes applied to the rails are provided with flanges corresponding with the flanges of the wheels, and when suddenly applied will prevent the wheels from bounding from the rails, the brakes holding them firmly in their proper position.

The peculiar characteristics of the brake are substantially as follows:—First. My brake is a lever, while the ordinary brake is a clutch. Second. The friction at the point which has the aid of purchase is transferred with increased power to the face of the wheels. Third. The force operating the brake is derived from the momentum of the train.

I refer to the annexed drawings for further description.

Figure 1. A perspective view of the car truck as arranged with the brakes attached, showing the operation upon the rail and wheels simultaneously. *a a* upper tangs of the brake; B B the lower shoe or rail bearing; *c* lever clutch attached to the lever shaft; D trussel beam.

Fig. 2. Side view of the brake. *a a* represent two of the bearing points upon the upper and lower quarters of the wheels. B represents the bearing of the lower shoe of the brake upon the rail.

Fig. 3. Side view of the arrangement of the brake as attached to the truck, when not in operation. Fig. 4. Skeleton view of a brake operating upon the wheels, as heretofore described, the shoe or lower surface being a radius from the central hub, and bearing upon the rail on a vertical central line. Fig. 5. A cam lever and slotted box as in operation. Fig. 6. The same as inoperative.

Having thus fully described the nature of my invention I do not claim any particular device or the construction of any plan of leverage for the purpose of operating the brake as that may be accomplished by various modes; but

What I desire to claim and secure by Letters Patent, is—

A lever form brake which when in action shall bear and brake simultaneously both upon the wheels and rails the friction upon the latter supplying the braking force upon the former and the whole being adjustable and self acting through the combined agency of an eccentric or cam bearing or resisting point between the brake and car all for the purpose and substantially as herein set forth and described.

MATTHIAS P. COONS.

In presence of—
EGBERT HEDGE,
SAML. B. CAWLEY.